United States Patent
Ma et al.

(10) Patent No.: US 11,050,503 B2
(45) Date of Patent: Jun. 29, 2021

(54) SYSTEM AND METHOD OF WAVEFORM DESIGN FOR OPERATION BANDWIDTH EXTENSION

(71) Applicant: Huawei Technologies Co., Ltd., Shenzhen (CN)

(72) Inventors: Jianglei Ma, Ottawa (CA); Ming Jia, Ottawa (CA); Liqing Zhang, Ottawa (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 23 days.

(21) Appl. No.: 14/932,857

(22) Filed: Nov. 4, 2015

(65) Prior Publication Data

US 2016/0294498 A1  Oct. 6, 2016

Related U.S. Application Data

(60) Provisional application No. 62/141,051, filed on Mar. 31, 2015.

(51) Int. Cl.
*H04J 11/00* (2006.01)
*H04L 5/00* (2006.01)
(Continued)

(52) U.S. Cl.
CPC .......... *H04J 11/0063* (2013.01); *H04L 5/001* (2013.01); *H04L 5/0007* (2013.01);
(Continued)

(58) Field of Classification Search
None
See application file for complete search history.

(56) References Cited

U.S. PATENT DOCUMENTS 9,820,281 B1 * 11/2017 Werner ............. H04W 72/0453
2007/0058595 A1 * 3/2007 Classon ................ H04L 1/1812
370/337
(Continued)

FOREIGN PATENT DOCUMENTS

CN   101335731 A   12/2008
CN   101640922 A   2/2010
(Continued)

OTHER PUBLICATIONS

IEEE Computer Society, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Standards Association, IEEE Std 802.11-2012 (Revision of IEEE Std 802.11-2007), Mar. 29, 2012, 2793 pages.
(Continued)

*Primary Examiner* — Noel R Beharry
*Assistant Examiner* — Rodrick Mak
(74) *Attorney, Agent, or Firm* — Slater Matsil, LLP

(57) ABSTRACT

Different numerologies may be used to communicate orthogonal frequency division multiplexing (OFDM)-based signals over different frequency sub-bands of a given carrier. This may allow the OFDM-based signals to efficiently support diverse traffic types. In some embodiments, the numerology of OFDM-based signal depends on a bandwidth of the frequency sub-band over which the OFDM-based signals are transmitted. In some embodiments, the OFDM-based signals are filtered OFDM (f-OFDM) signals, and the pulse shaping digital filter used to generate the f-OFDM signals allows the receiver to mitigate interference between adjacent f-OFDM signals upon reception, thereby allowing
(Continued)

f-OFDM signals to be communicated over consecutive carriers without relying on a guard band.

40 Claims, 7 Drawing Sheets

(51) Int. Cl.
*H04L 25/03* (2006.01)
*H04L 27/26* (2006.01)

(52) U.S. Cl.
CPC ...... *H04L 5/0064* (2013.01); *H04L 25/03834* (2013.01); *H04L 27/264* (2013.01); *H04L 27/2626* (2013.01); *H04L 27/2647* (2013.01); *H04L 5/0023* (2013.01)

(56) References Cited

U.S. PATENT DOCUMENTS

| | | | | |
|---|---|---|---|---|
| 2007/0195690 | A1* | 8/2007 | Bhushan | H04L 5/0042 370/208 |
| 2008/0056117 | A1* | 3/2008 | Muharemovic | H04L 5/0033 370/203 |
| 2008/0095195 | A1* | 4/2008 | Ahmadi | H04L 5/0007 370/478 |
| 2009/0310589 | A1* | 12/2009 | Nangia | H04L 5/0007 370/344 |
| 2010/0149961 | A1* | 6/2010 | Lee | H04L 5/0007 370/204 |
| 2011/0032850 | A1 | 2/2011 | Cai | |
| 2011/0041027 | A1* | 2/2011 | Fong | H04L 1/1812 714/749 |
| 2011/0096783 | A1 | 4/2011 | Cai et al. | |
| 2011/0255478 | A1 | 10/2011 | Shen et al. | |
| 2011/0317647 | A1* | 12/2011 | Cho | H04L 5/0007 370/329 |
| 2012/0093073 | A1* | 4/2012 | Lunttila | H04L 1/1607 370/328 |
| 2013/0195002 | A1* | 8/2013 | Walker | H04L 5/005 370/312 |
| 2015/0139118 | A1* | 5/2015 | Azizi | H04L 5/003 370/329 |
| 2015/0282178 | A1 | 10/2015 | Kim et al. | |
| 2015/0358971 | A1* | 12/2015 | Soriaga | H04L 1/0057 370/329 |
| 2015/0372843 | A1* | 12/2015 | Bala | H04L 25/03834 375/295 |
| 2016/0192366 | A1* | 6/2016 | Mizusawa | H04J 11/005 370/281 |
| 2016/0241323 | A1* | 8/2016 | Ko | H04B 7/0691 |
| 2016/0352551 | A1* | 12/2016 | Zhang | H04L 27/2602 |
| 2017/0310433 | A1* | 10/2017 | Dinan | H04L 5/0098 |
| 2018/0048511 | A1* | 2/2018 | Hakola | H04J 11/003 |
| 2018/0199341 | A1* | 7/2018 | Baldemair | H04L 27/264 |
| 2019/0075006 | A1* | 3/2019 | Yi | H04L 27/2602 |

FOREIGN PATENT DOCUMENTS

| | | |
|---|---|---|
| CN | 101778419 A | 7/2010 |
| CN | 101904125 A | 12/2010 |
| CN | 101932104 A | 12/2010 |
| CN | 102263766 A | 11/2011 |
| CN | 102761513 A | 10/2012 |
| CN | 103733560 A | 4/2014 |
| JP | 2012529193 A | 11/2012 |
| KR | 20120040688 A | 4/2012 |
| WO | 2007050921 A2 | 5/2007 |
| WO | 2014065563 A1 | 5/2014 |
| WO | 2014085710 A1 | 6/2014 |
| WO | 2014130554 A1 | 8/2014 |
| WO | WO-2014139562 A1 * | 9/2014 ......... H04L 27/2628 |

OTHER PUBLICATIONS

IEEE,Part 11: Wireless LAN Medium Access Control (MAC) and Physical Layer (PHY) Specifications, Amendment 4: Enhancements for Very High Throughput for Operation in Bands below 6 GHz., IEEE 802.11ac-2013, Dec. 11, 2013, 425 pages.

Alcatel-Lucent, et al., "Extension Carriers and Carrier Segments in LTE-A," 3GPP TSG-RAN WG1 #59bis, R1-100407, Jan. 18-22, 2010, 4 pages, Valencia, Spain.

Hongyun, Q., et a., "Further Consideration on IEEE 802.16m OFDMA Numerology", IEEE C802.16m-08/236r3, Mar. 2008, 22 Pages.

NTT Docomo, Inc., "5G White Paper, 5G Radio Access: Requirements, Concept and Technologies," Jul. 2014. 13 pages.

Renesas Mobile Europe; "Motivation of CC Specific TDD Configuration;" 3GPP TSG-RAN WG1 Meeting#66bis, R1-113165, Zhuhai, China, Oct. 10-14, 2011, 3 pages.

* cited by examiner

SYSTEM AND METHOD OF WAVEFORM DESIGN FOR OPERATION BANDWIDTH EXTENSION

This patent application claims priority to U.S. Provisional Application No. 62/141,051, filed on Mar. 31, 2015 and entitled "System and Method of Waveform Design for Operation Bandwidth Extension," which is hereby incorporated by reference herein as if reproduced in its entirety.

TECHNICAL FIELD

The present invention relates to a system and method for wireless communications, and, in particular embodiments, to a system and method of waveform design for operation bandwidth extension.

BACKGROUND

In order to provide high throughput rates to individual mobile devices and further enhance system capacity, next generation wireless networks are likely to use bandwidth allocations that are much broader than the 20 megahertz (MHz) carriers used in conventional Long Term Evolution (LTE) networks. In some cases, the bandwidth allocations may exceed 100 MHz for carriers having center frequencies below or above 6 gigahertz (GHz). Techniques for supporting such large bandwidth allocations are needed.

One technique for increasing throughput is carrier aggregation, which uses multiple carriers to communicate data to a single mobile device. However, conventional orthogonal frequency division multiplexed (OFDM) carrier aggregation utilizes scalable sampling frequencies and Fast Fourier Transform (FFT) sizes, meaning that broader bandwidth allocations utilize higher sampling frequencies and larger FFT sizes, which increase computational complexity. Additionally, conventional OFDM carrier aggregation requires that the same sub-carrier spacings are used for each of the aggregated carriers. As a result, conventional OFDM carrier aggregation may be ill-suited for bandwidth allocations in excess of 20 MHz.

SUMMARY OF THE INVENTION

Technical advantages are generally achieved, by embodiments of this disclosure which describe system and method of waveform design for operation bandwidth extension.

In accordance with an embodiment, a method for transmitting signals is provided. In this example, the method comprises transmitting a first orthogonal frequency division multiplexing (OFDM)-based signal over a first frequency sub-band of a carrier and a second OFDM-based signal over a second frequency sub-band of the carrier. The first frequency sub-band has a first bandwidth and a first numerology based on the first bandwidth. The second frequency sub-band has a second bandwidth and a second numerology based on the second bandwidth. An apparatus for performing this method is also provided.

In accordance with another embodiment, a method for receiving signals is provided. In this example, the method comprises receiving a first orthogonal frequency division multiplexing (OFDM)-based signal over a first frequency sub-band of a carrier and a second OFDM-based signal over a second frequency sub-band of the carrier. The first frequency sub-band has a first bandwidth and a first numerology based on the first bandwidth, the second frequency sub-band has a second bandwidth and a second numerology based on the second bandwidth. An apparatus for performing this method is also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
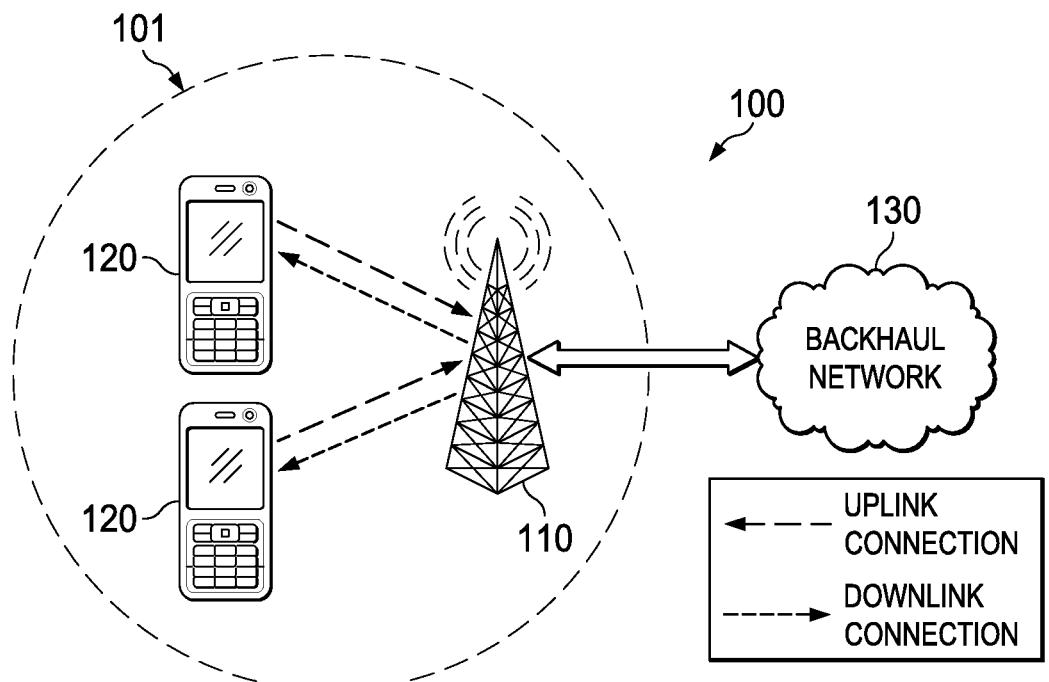
FIG. 1 illustrates a diagram of an embodiment wireless network.

The structure, manufacture and use of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. As referred to herein, a frequency sub-band may include an entire carrier, or a portion of a carrier. Hence, different frequency sub-bands may be different carriers, or portions of the same carrier.

As mentioned above, conventional OFDM carrier aggregation utilizes scalable sampling frequencies and FFT sizes. As a result, conventional OFDM carrier aggregation may be ill-suited for bandwidth allocations in excess of 20 MHz, as the high sampling frequencies and large FFT sizes required to support such large bandwidth allocations may significantly increase the implementation complexity of conventional OFDM carrier aggregation. Also, conventional OFDM carrier aggregation requires that the same physical layer parameters are used to communicate OFDM signals over a given carrier. The set of physical layer parameters used to communicate a signal are collectively referred to as the "numerology" of the signal, and may include a combination, or subset, of a transmission time interval (TTI) used to transmit the signal, a symbol duration of symbols carried by the signal, a cyclic prefix (CP) length of symbols carried by the signal, and/or a sub-carrier spacing between sub-carrier frequencies over which the signal is transmitted. Different physical layer parameters may be better suited for communicating different traffic types. For example, a short TTI may reduce latency and therefore be better suited for delay-sensitive traffic. A longer TTI may reduce scheduling signaling overhead and therefore be better suited for delay tolerant traffic. Because conventional OFDM carrier aggregation uses the same numerology for all signals communicated over a given carrier, a network and/or user may experience a reduction in bandwidth utilization efficiency and/or performance when conventional OFDM carrier aggregation is used to transport different traffic types over the same carrier. Moreover, conventional OFDM carrier aggregation relies on a guard band that is at least fifty multiples of the sub-carrier spacing to mitigate inter-carrier interference, which adds significant overhead to the signals. Accordingly, an efficient alternative to conventional OFDM carrier aggregation is desired.

Embodiments of this disclosure use different numerologies to communicate f-OFDM signals or single carrier frequency division multiple access (SC-FDMA) signals over different frequency sub-bands of a given carrier, which allows the f-OFDM or SC-FDMA signals to efficiently support diverse traffic. For example, delay sensitive traffic (e.g., voice, mobile gaming) may be communicated over an f-OFDM signal with a relatively short TTI to reduce latency, and delay tolerant traffic (e.g., email, text messages) may be communicated over an f-OFDM signal with a relatively long TTI to improve bandwidth utilization efficiency. Additionally, the pulse shaping digital filter used to generate f-OFDM signals may allow the receiver to mitigate interference between adjacent f-OFDM signals upon reception, thereby allowing f-OFDM signals to be communicated over consecutive carriers without relying on a guard band. In some embodiments, the numerology of an f-OFDM or SC-FDMA signal depends on a bandwidth of the frequency sub-band over which the f-OFDM or SC-FDMA signal is transmitted. For example, f-OFDM/SC-FDMA signals communicated over wider frequency sub-bands may typically have wider subcarrier spacings, shorter symbol durations, shorter TTI lengths and shorter cyclic prefixes than f-OFDM/SC-FDMA signals communicated over narrower frequency sub-bands. For example, f-OFDM/SC-FDMA signals communicated over different 20 megahertz (MHz) sub-bands may have different numerologies. These and other aspects are explained in greater detail below. While much of this disclosure describes embodiments for communicating f-OFDM signals, it should be appreciated that those embodiments can also be applied to communicate any OFDM-based signals, including SC-FDMA signals.

Figure 2A:
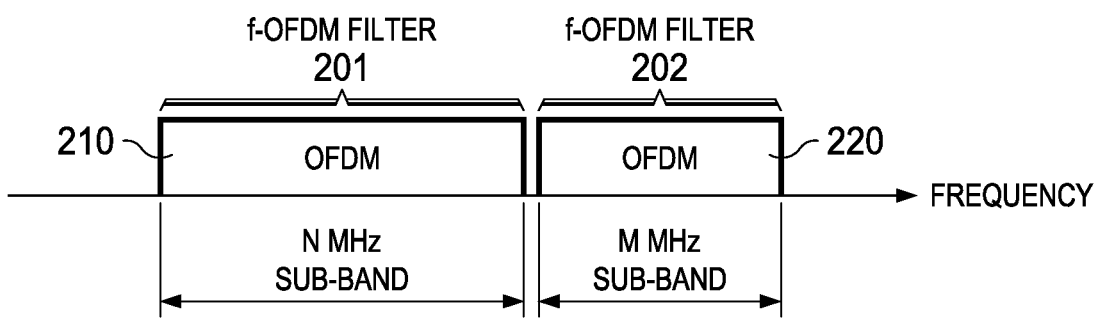
FIGS. 2A-2B are diagrams depicting how filtered OFDM (f-OFDM) signals are generated.
Figure 2B:

FIG. 1 is a diagram of a wireless network 100 for communicating data. The wireless network 100 includes a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station. The terms "mobile device," "user equipment (UE)," and "mobile station (STA)" are used interchangeably throughout this disclosure. In some embodiments, the network 100 may comprise various other wireless devices, such as relays, low power nodes, etc.

f-OFDM signals are generated by applying a pulse shaping digital filter to OFDM signals. The pulse shaping digital filters used to generate f-OFDM signals are referred to as f-OFDM filters throughput this disclosure. FIG. 2A is a diagram showing how f-OFDM signals are generated by applying f-OFDM filters 201, 202 to OFDM signals 210, 220. As shown, the OFDM signal 210 spans an N megahertz (MHz) frequency sub-band, and the OFDM signal 220 spans an M MHz frequency sub-band, where N and M are positive integers, and N is greater than or equal to M. FIG. 2B is a diagram showing the f-OFDM signals 211, 221 that result from applying the f-OFDM filters 201, 202 to the OFDM signals 210, 220. In some embodiments, the f-OFDM filters 201, 202 produce f-OFDM signals having different numerologies, in which case the f-OFDM signal 210 and the f-OFDM signal 220 exhibit different numerologies than one another. The numerologies of the f-OFDM signals 211, 221 may depend on the bandwidth of the N MHz frequency sub-band and the M MHz frequency sub-band, respectively.

Figure 3A:
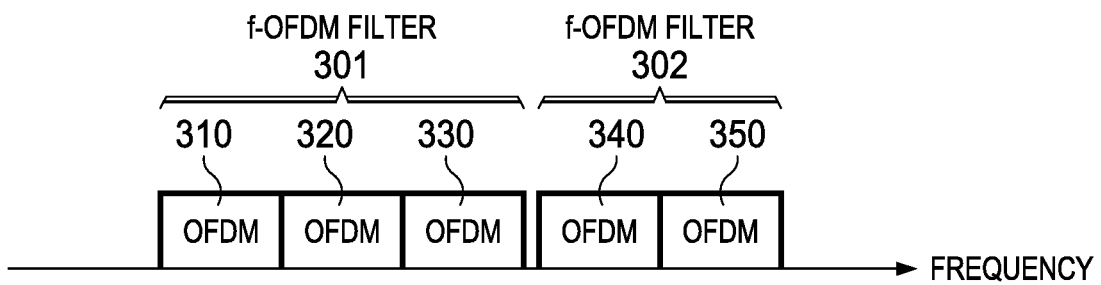
FIGS. 3A-3B are additional diagrams depicting how f-OFDM signals are generated.
Figure 3B:
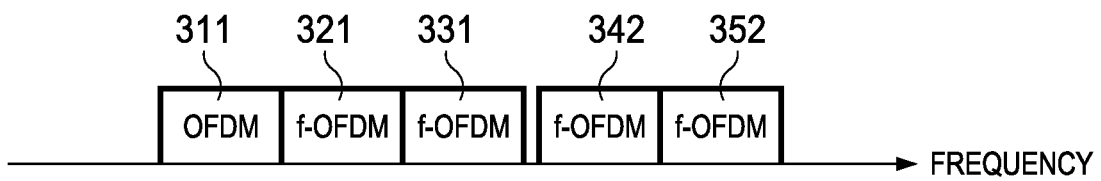

In some embodiments, a single f-OFDM filter may be used to generate multiple f-OFDM signals. FIG. 3A is a diagram showing how f-OFDM signals are generated by applying f-OFDM filters 301, 302 to OFDM signals 310, 320, 330, 340, 350. FIG. 3B is a diagram showing the f-OFDM signals 311, 321, 331, 342, 352 that result from applying the f-OFDM filters 301, 302 to the OFDM signals 310, 320, 330, 340, 350. Specifically, the f-OFDM signals 311, 321, 331 are generated by applying the f-OFDM filter 301 to the OFDM signals 310, 320, 330 (respectively), and the f-OFDM signals 342, 352 are generated by applying the f-OFDM filter 302 to the OFDM signals 340, 350 (respectively). F-OFDM signals generated from the same f-OFDM filter may have the same numerology. Thus, the f-OFDM signals 311, 321, 331 have the same numerology as one another, while the f-OFDM signals 342, 352 have the same numerology as one another. F-OFDM signals generated from different f-OFDM filters may have different numerologies. Thus, the f-OFDM signals 311, 321, 331 may have a different numerology than the f-OFDM signals 342, 352.

Figure 4:
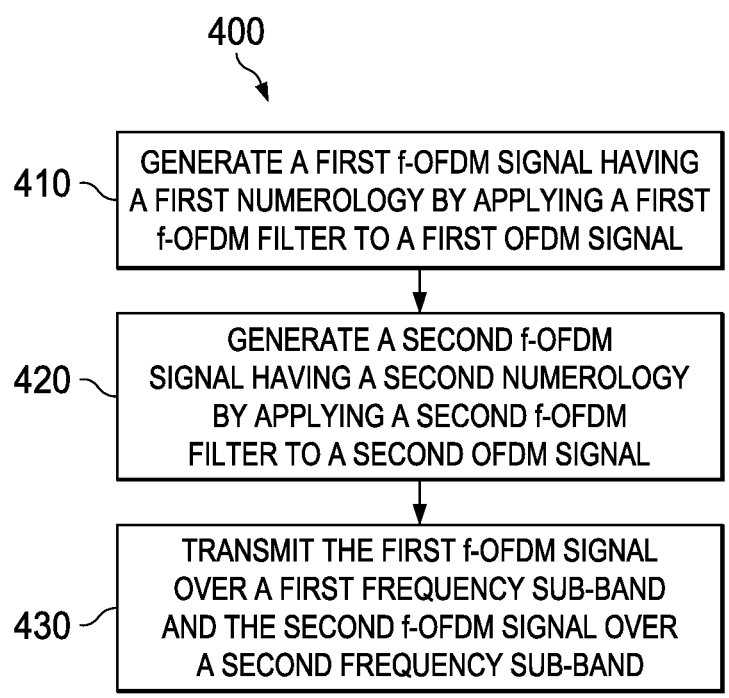
FIG. 4 is a flowchart of an embodiment method for communicating f-OFDM signals.

FIG. 4 is a flowchart of an embodiment method 400 for communicating f-OFDM signals having different numerologies over different frequency sub-bands, as might be performed by a transmit point. The transmit point may be any device that transmits wireless signals, including network-side devices (e.g., base stations) and user-side devices (e.g., UEs). At step 410, the transmit point generates a first f-OFDM signal by applying a first f-OFDM filter to a first OFDM signal. At step 420, the transmit point generates a second f-OFDM signal by applying a second f-OFDM filter to a second OFDM signal. At step 430, the transmit point transmits the first f-OFDM signal over a first frequency sub-band, while transmitting the second f-OFDM signal over a second frequency sub-band. The first frequency sub-band has a different bandwidth than the second frequency sub-band. In some embodiments, the f-OFDM signals have numerologies based on the bandwidth of the respective frequency sub-bands over which the f-OFDM signals are transmitted, in which case the first f-OFDM signal has a different numerology than the second f-OFDM signal.

Figure 5:
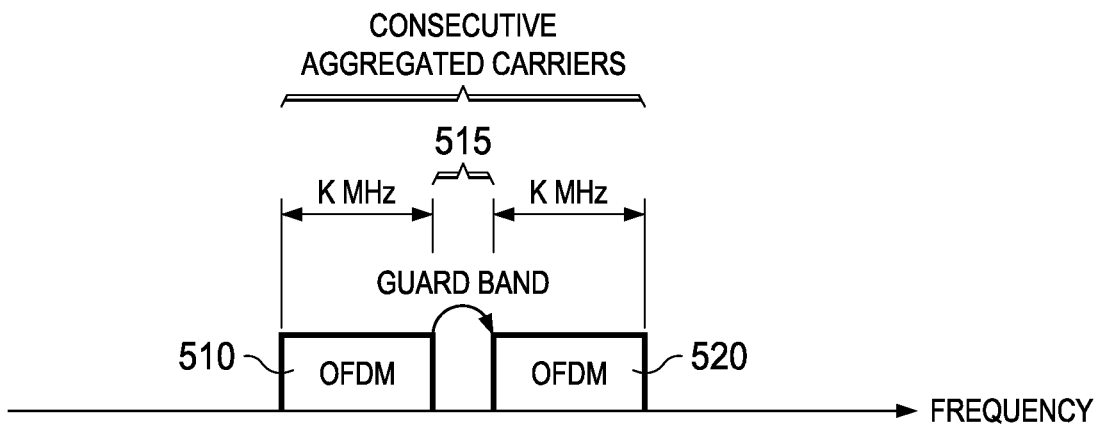
FIG. 5 is a diagram of a conventional OFDM carrier aggregation format.

Conventional OFDM carrier aggregation communicates data to a single UE over multiple carriers to increase the overall throughput provided to the UE. Conventional OFDM carrier aggregation may also communicate data to multiple UEs over multiple carriers to enhance system capacity. As discussed above, conventional OFDM carrier aggregation utilizes the same numerology for signals communicated over each of the carriers, and requires that consecutive carriers be separated by a guard band that is at least fifty multiples of the corresponding sub-carrier spacing to mitigate interference between the OFDM signals below a threshold. FIG. 5 is a diagram of OFDM signals 510, 520 transmitted over consecutive K MHz carriers (K is an integer) in accordance with a conventional OFDM carrier aggregation scheme. As shown, the K MHz carriers are consecutive carriers in the frequency domain, and are separated by a guard band 515. Conventional OFDM carrier aggregation requires that the guard band 515 is at least fifty multiples of a subcarrier spacing of the K MHz carriers. The guard band 515 mitigates interference between the OFDM signals 510, 520. The relative size of the guard band 515 depends on the bandwidth of the K MHz carriers. For example, 1.25 megahertz (MHz) OFDM carriers must be separated by a guard band that is fifty-two multiples of the sub-carrier spacing of the 1.25 MHz carriers, and larger bandwidth OFDM carriers (e.g., 2.5 MHz, 5 MHz, . . . 20 MHz) must be separated by correspondingly wider guard bands. Conventional OFDM carrier aggregation also requires that the OFDM signals 510, 520 be transmitted using the same numerologies. Numerologies for OFDM signals communicated using conventional OFDM carrier aggregation are listed in Table 1 below:

TABLE 1

| Channel Bandwidth (MHz) | 1.25 | 2.5 | 5 | 10 | 15 | 20 |
|---|---|---|---|---|---|---|
| Frame Duration (ms) | | | | 10 | | |
| Subframe Duration (ms) | | | | 1 | | |
| Sub-carrier Spacing (kHz) | | | | 15 | | |
| Sampling Frequency (MHz) | 1.92 | 3.84 | 7.68 | 15.36 | 23.04 | 30.72 |
| FFT Size | 128 | 256 | 512 | 1024 | 1536 | 2048 |
| Occupied Sub-carriers (inc. DC sub-carrier) | 76 | 151 | 301 | 601 | 901 | 1201 |
| Guard Sub-carriers | 52 | 105 | 211 | 423 | 635 | 847 |
| Number of Resource Blocks | 6 | 12 | 25 | 50 | 75 | 100 |
| Occupied Channel Bandwidth (MHz) | 1.140 | 2.265 | 4.515 | 9.015 | 13.515 | 18.015 |
| DL Bandwidth Efficiency | 77.1% | 90% | 90% | 90% | 90% | 90% |
| OFDM Symbols/Subframe | | | 7/6 (short/long CP) | | | |
| CP Length (Short CP) (μs) | | | 5.2 (first symbol)/4.69 (six following symbols) | | | |
| CP Length (Long CP) (μs) | | | 16.67 | | | |

Figure 6:
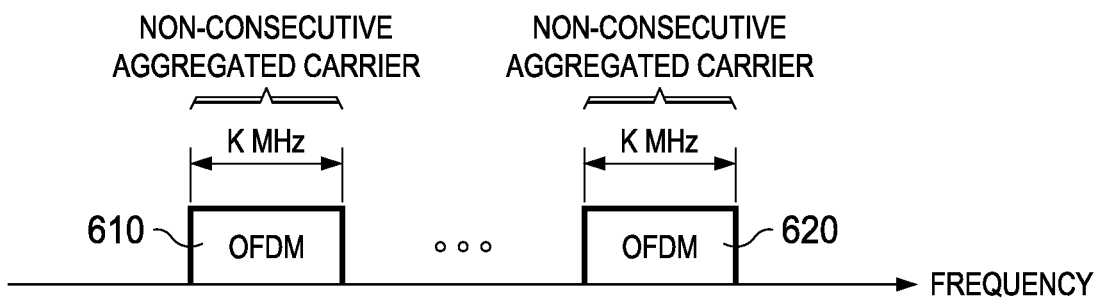
FIG. 6 is another diagram of a conventional OFDM carrier aggregation format.

Conventional OFDM carrier aggregation may also communicate data over non-consecutive carriers. FIG. 6 is a diagram of OFDM signals 610, 620 are transmitted over non-consecutive K MHz carriers (K is an integer) in accordance with a conventional OFDM carrier aggregation scheme. Similar to OFDM signals communicated over consecutive carriers, conventional OFDM carrier aggregation requires that the OFDM signals 610, 620 communicated over non-consecutive carriers use the same numerologies.

Figure 7:
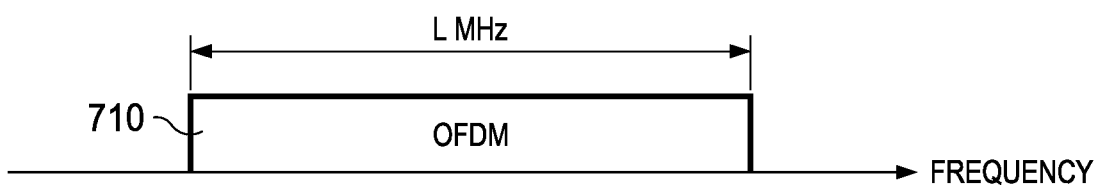
FIG. 7 is a diagram of a conventional OFDM extended carrier format.

One alternative to conventional OFDM carrier aggregation is to transmit an OFDM signal over an extended carrier having a bandwidth that exceeds 20 MHz, which is the largest carrier bandwidth available in fourth generation Long Term Evolution (LTE) networks. FIG. 7 is a diagram of an OFDM signal 710 transmitted over an L MHz carrier (L is an integer larger than 20). Although this approach avoids overhead associated with the guard band utilized in conventional OFDM carrier aggregation, transmitting an OFDM signal over an extended carrier (e.g., greater than 20 MHz) also has drawbacks, such as requiring a higher sampling frequency and larger fast Fourier transform (FFT) size. Additionally, an OFDM signal transmitted over an extended carrier would still utilize a single numerology for all data carried by the OFDM signal, and would therefore exhibit reduced bandwidth utilization efficiency and/or performance when carrying different traffic types.

Figure 8:
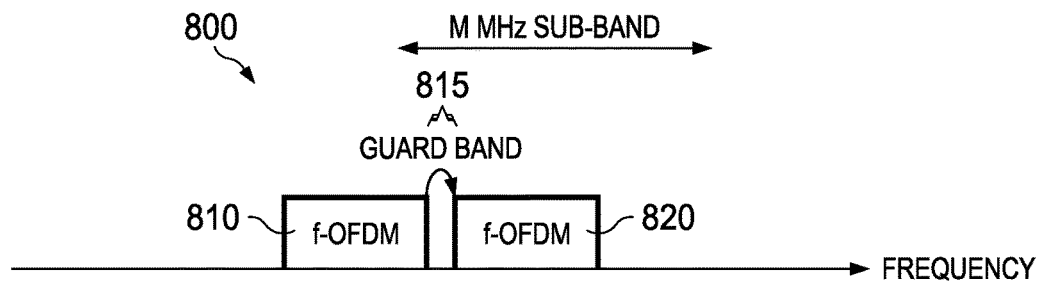
FIG. 8 is a diagram of f-OFDM signals transmitted over consecutive frequency sub-bands.

Embodiments of this disclosure communicate f-OFDM signals over consecutive frequency sub-bands that are separated by a guard band that is less than twenty multiples of a subcarrier spacing of one of the carriers. FIG. 8 is a diagram of f-OFDM signals 810, 820 transmitted over consecutive frequency sub-bands that are separated by a guard band 815 that is less than twenty multiples of a subcarrier spacing of one of the frequency sub-bands. In one embodiment, the guard band 815 is less than or equal to ten multiples of the sub-carrier spacing of one of the f-OFDM signals 810, 820. In another embodiment, the guard band 815 is less than or equal to five multiples of the sub-carrier spacing of one of the f-OFDM signals 810, 820. In yet another embodiment, the guard band 815 is less than or equal to three multiples of the sub-carrier spacing of one of the f-OFDM signals 810, 820. In yet another embodiment, the guard band 815 is less than or equal to the sub-carrier spacing of one of the f-OFDM signals 810, 820.

The f-OFDM signals 810, 820 may be transmitted to the same receiver (e.g., the same UE) or to different receivers. The respective frequency sub-bands over which the f-OFDM signals 810, 820 are transmitted may have the same subcarrier spacing or different subcarrier spacings. When the respective frequency sub-bands have different subcarrier spacings, the guard band 815 is less than twenty multiples of the wider of the two subcarrier spacings. In some embodiments, the guard band 815 is also less than twenty multiples of the narrower of the two subcarrier spacings. In other embodiments, the guard band 815 is less than the wider of the two subcarrier spacings, but greater than twenty multiples of the narrower of the two subcarrier spacings.

Figure 9:
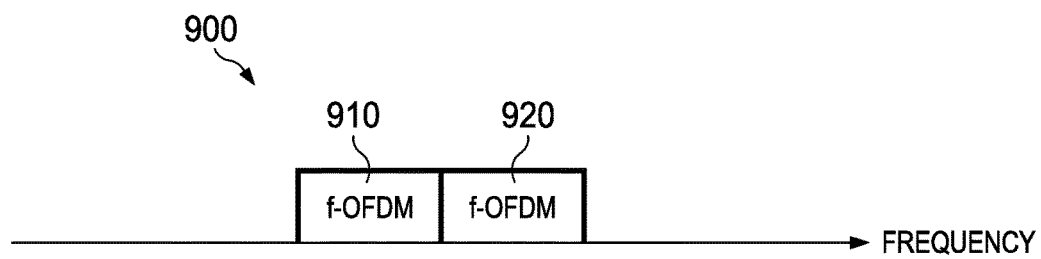
FIG. 9 is another diagram of f-OFDM signals transmitted over consecutive frequency sub-bands.

Embodiments of this disclosure communicate f-OFDM signals over consecutive frequency sub-bands that are not separated by a guard band. FIG. 9 is a diagram of f-OFDM signals 910, 920 transmitted over consecutive frequency sub-bands that that are not separated by a guard band. The f-OFDM signals 910, 920 may be transmitted to the same receiver or to different receivers.

Figure 10:
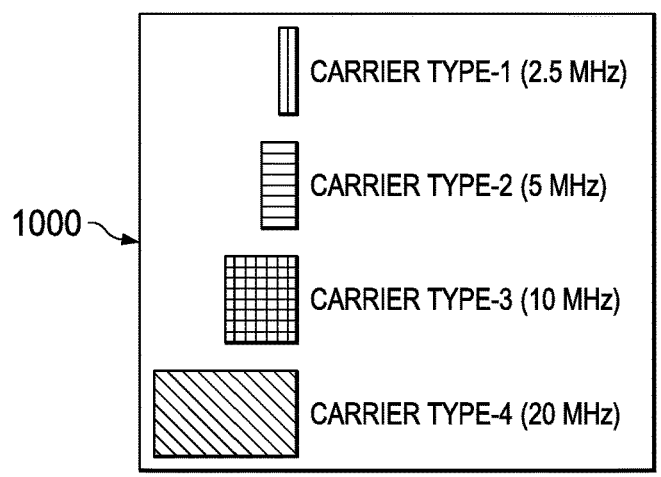
FIG. 10 is a diagram of a set of predefined carriers types for a cellular communication system.

In some embodiments, f-OFDM signals are communicated over aggregated carriers. In such embodiments, there may be a predefined set of carrier bandwidths for a wireless network, with each carrier bandwidth having one or more predefined numerologies. FIG. 10 is a diagram of a set of predefined carrier types 1000 for a cellular communication system. In this example, the set of predefined carriers types 1000 includes a first carrier type (Type-1) with a 2.5 MHz bandwidth, a second carrier type (Type-2) with a 5 MHz bandwidth, a third carrier type (Type-3) with a 10 MHz bandwidth, and a fourth carrier type (Type-4) with a 20 MHz bandwidth. Other examples are also possible. Numerologies for the set of predefined carrier types 1000 are listed in Table 2.

TABLE 2

| SC Spacing (kHz) | 7.5 | 7.5 | 7.5 | 7.5 | 15 | 30 | 60 | 120 |
|---|---|---|---|---|---|---|---|---|
| Carrier Bandwidth (MHz) | 2.5 | 5 | 10 | 15 | 20 | 20 | 20 | 20 |
| Number of subcarriers | 300 | 600 | 1200 | 1800 | 1200 | 600 | 300 | 150 |
| FFT Size | 512 | 1024 | 2048 | 2048 | 2048 | 1024 | 512 | 256 |
| Sampling Frequency (MHz) | 3.84 | 7.68 | 15.36 | 15.36 | 30.72 | 30.72 | 30.72 | 30.72 |

Figure 11:
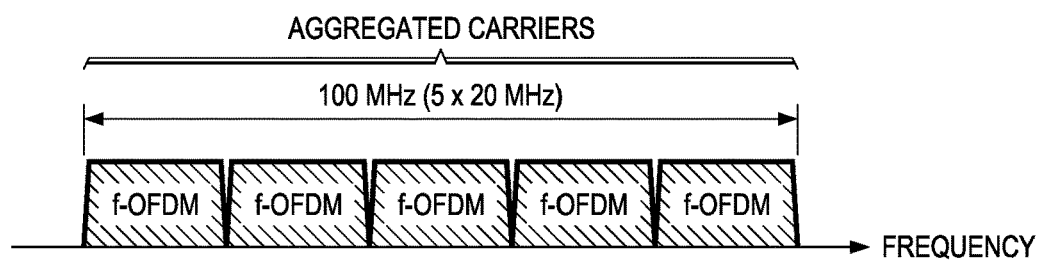
FIG. 11 is a diagram of an embodiment f-OFDM carrier aggregation format.
Figure 12:
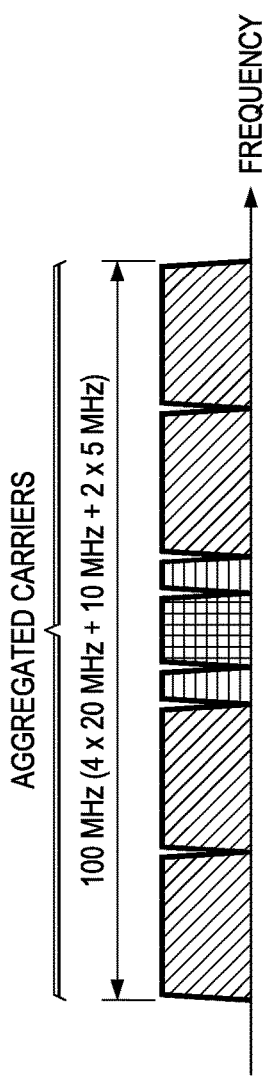
FIG. 12 is a diagram of another embodiment f-OFDM carrier aggregation format.
Figure 13:
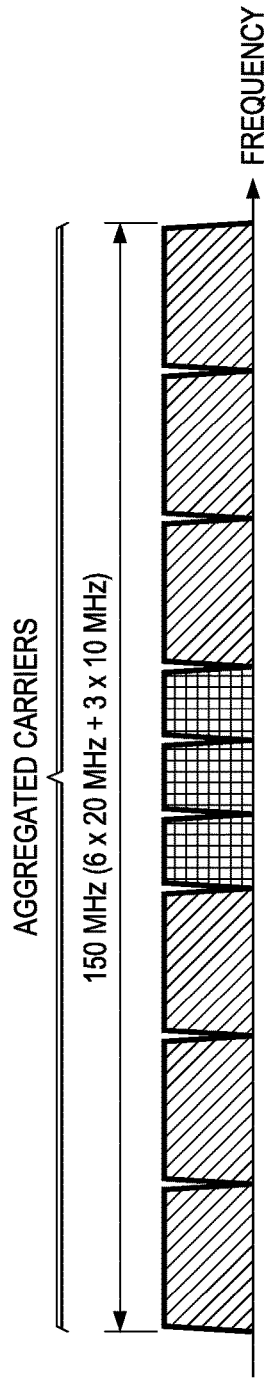
FIG. 13 is a diagram of yet another embodiment f-OFDM carrier aggregation format.
Figure 14:
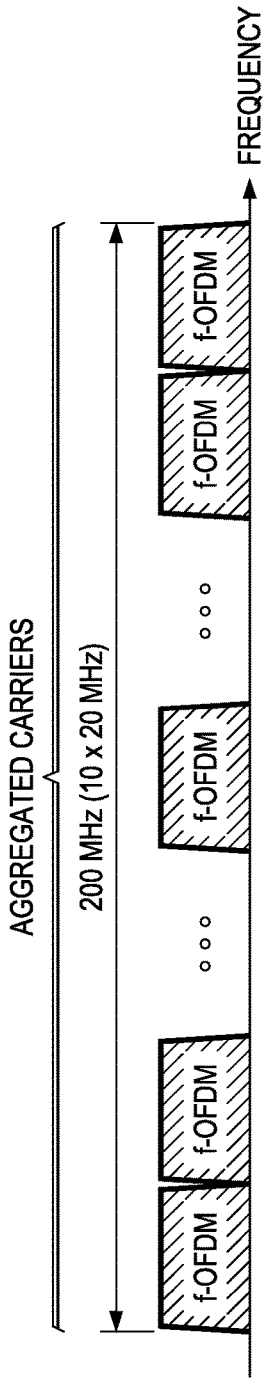
FIG. 14 is a diagram of yet another embodiment f-OFDM carrier aggregation format.

FIGS. 11-14 are diagrams of various f-OFDM carrier aggregation formats generated from the set of predefined carrier bandwidths 1000. FIG. 11 is a diagram of a 100 MHz f-OFDM carrier aggregation format that includes five 20 MHz carriers that are consecutive in the frequency domain. FIG. 12 is a diagram of a 100 MHz f-OFDM carrier aggregation format that includes four 20 MHz carriers, one 10 MHz carrier, and two 5 MHz carriers that are consecutive in the frequency domain. FIG. 13 is a diagram of a 150 MHz f-OFDM carrier aggregation format that includes six 20 MHz carriers and three 10 MHz carriers that are consecutive in the frequency domain. FIG. 14 is a diagram of a 200 MHz f-OFDM carrier aggregation format that includes ten 20 MHz carriers that are consecutive in the frequency domain. Embodiment f-OFDM carrier aggregation formats may include any combination of predefined carriers. For example, a 50 MHz f-OFDM carrier aggregation format may aggregate two 20 MHz bandwidths with a 10 MHz bandwidth. Embodiments may also carriers with different bandwidths and/or numerologies, such a 40 MHz carrier. In some embodiments, f-OFDM carrier aggregation is achieved by aggregating multiple carriers having the same numerology.

Figure 15:
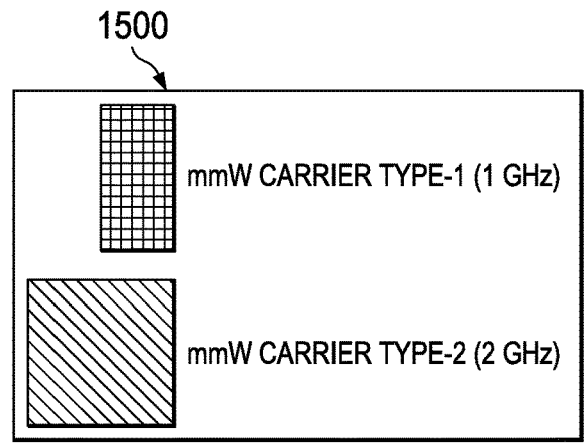
FIG. 15 is a diagram of a set of predefined carrier types for a millimeter wave (mmW) communication system.

FIG. 15 is a diagram of a set of predefined carrier types 1500 for a millimeter wave (mmW) communication system. In this example, the set of predefined carrier types 1500 includes a first mmW carrier type (Type-1) with a 1 GHz bandwidth, and a second mmW carrier type (Type-2) with a 2 GHz bandwidth. Phase noise may be a factor used to determine the subcarrier spacing in mmW bands. A subcarrier spacing of between 600 KHz and 10 MHz may be used for mmW bands and/or frequency sub-bands between 6 GHz and 100 GHz. In an embodiment, scalable subcarrier spacing is achieved by using a 1.2 MHz subcarrier spacing for frequency sub-bands between 6 GHz and 28 GHz, a 4.8 MHz subcarrier spacing for frequency sub-bands between 28 GHz and 50 GHz, and a 9.6 MHz subcarrier spacing for frequency sub-bands between 50 GHz and 100 GHz. Other examples are also possible. Numerologies for the set of predefined carrier types 1500 are listed in Table 3.

TABLE 3

| Carrier Bandwidth (GHz) | 1 | 2 | 1 | 2 | 1 | 2 |
|---|---|---|---|---|---|---|
| SC Spacing (MHz) | 1.2 | 1.2 | 4.8 | 4.8 | 9.6 | 9.6 |
| Number of Subcarriers | 750 | 1500 | 187.5 | 375 | 93.75 | 187.5 |
| FFT Size | 1024 | 2048 | 256 | 512 | 128 | 256 |
| Sampling frequency (MHz) | 1228.8 | 2457.6 | 1228.8 | 2457.6 | 1228.8 | 2457.6 |

Figure 16:
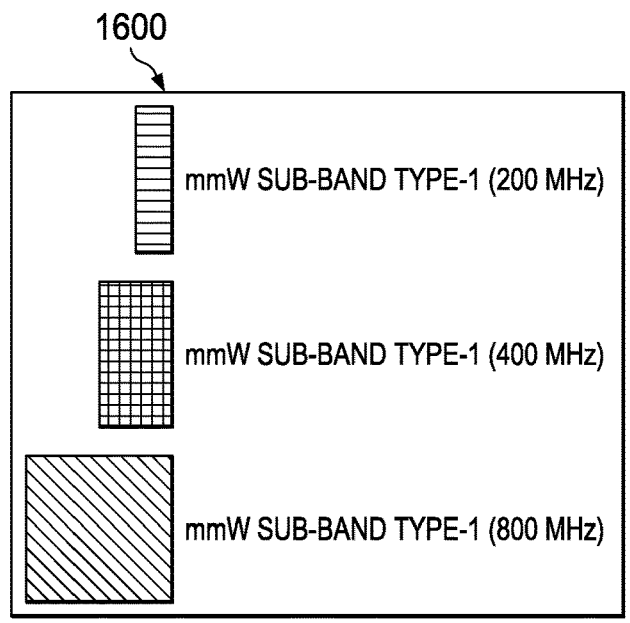
FIG. 16 is a diagram of a set of predefined sub-band types for a mmW communication system.

In some embodiments, mmW carrier types are fragmented into frequency sub-bands having a smaller bandwidth than the mmW carrier types depicted in FIG. 15. FIG. 16 is a diagram of a set of predefined frequency sub-band types 1600 for a mmW communication system. In this example, the set of predefined frequency sub-band types 1600 includes a first mmW sub-band type (Type-1) with a 200 MHz bandwidth, a second mmW sub-band type (Type-2) with a 400 MHz bandwidth, and a third mmW sub-band type (Type-3) with a 800 MHz bandwidth. Numerologies for the set of predefined frequency sub-band types 1600 are listed in Table 4.

TABLE 4

| Sub-band Bandwidth (MHz) | 200 | 400 | 400 | 800 | 800 |
|---|---|---|---|---|---|
| SC spacing (MHz) | 1.2 | 1.2 | 4.8 | 4.8 | 9.6 |
| Number of subcarriers | 150 | 300 | 75 | 150 | 75 |
| FFT Size | 256 | 512 | 128 | 256 | 128 |
| Sampling frequency (MHz) | 307.2 | 614.4 | 614.4 | 1228.8 | 1228.8 |

It should be appreciated that the numerologies and sub-band bandwidths listed in Tables 2-4 are provided as examples, and that embodiments of this disclosure may use numerologies and/or sub-band bandwidths that are not explicitly listed in those tables. It should also be appreciated that bandwidths can be fragmented into two sub-bands, each of which can apply different numerologies.

Figure 17:
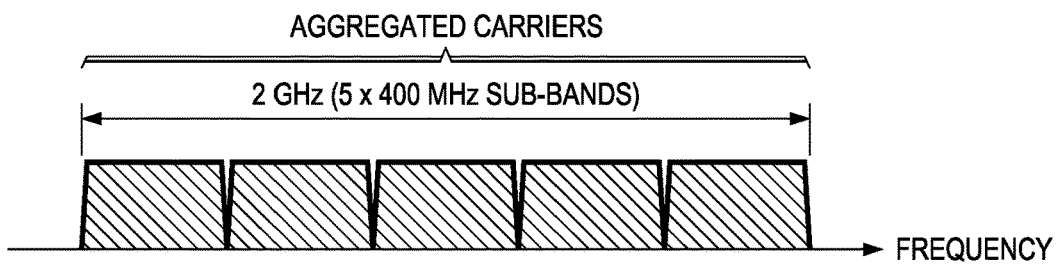
FIG. 17 is a diagram of yet another embodiment f-OFDM carrier aggregation format.
Figure 18:
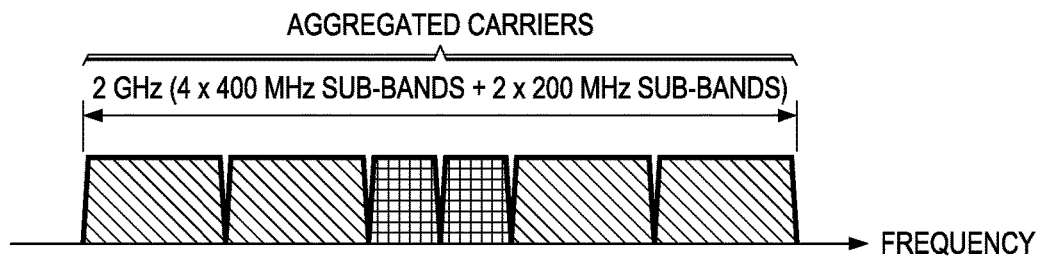
FIG. 18 is a diagram of yet another embodiment f-OFDM carrier aggregation format.

FIGS. 17-18 are diagrams of various f-OFDM carrier aggregation formats generated from the set of predefined sub-band types 1600 depicted in FIG. 16. FIG. 17 is a diagram of a 2 GHz f-OFDM sub-band aggregation format that includes five 400 MHz sub-bands. FIG. 18 is a diagram of a 2 GHz f-OFDM sub-band aggregation format that includes four 400 MHz sub-bands and two 200 MHz sub-bands.

In some millimeter wave communication systems, numerologies may be based on sub-carrier spacing. Numerologies for such an example are listed in table 5.

TABLE 5

| | | | |
|---|---|---|---|
| SC Spacing (MHz) | 1.2 | 4.8 | 9.6 |
| Useful Symbol Duration (us) | 0.8333 | 0.208 | 0.104 |
| CP length (μs) | 0.208 | 0.052 | 0.026 |
| Number of Symbols per TTI | 48 | 192 | 384 |
| TTI (μs) | 50 | 50 | 50 |
| CP overhead | 20.00% | 20.00% | 20.00% |

Figure 19:
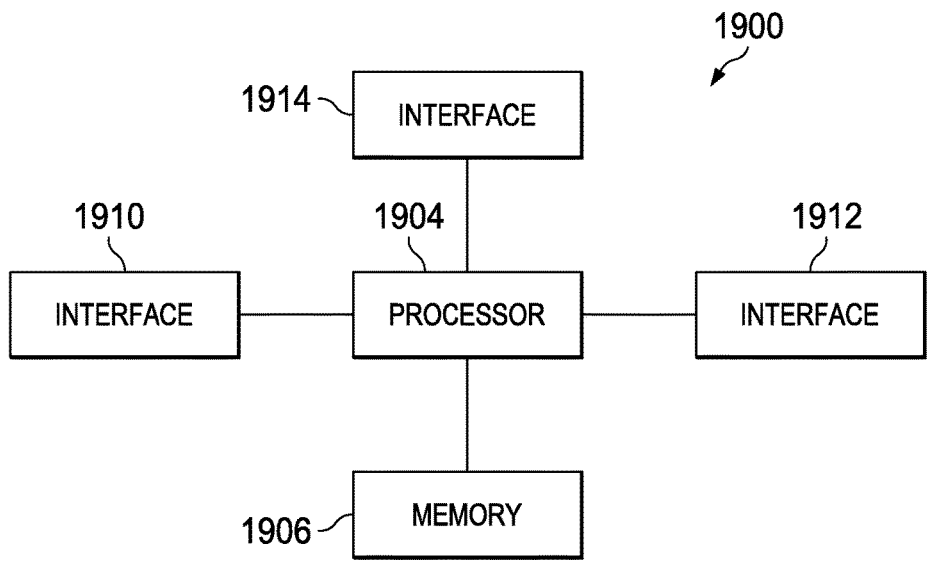
FIG. 19 is a diagram of an embodiment processing system.

FIG. 19 is a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown in FIG. 19. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in FIG. 19, such as long term storage (e.g., non-volatile memory, etc.).

In some embodiments, the processing system 1900 is included in a network device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 20:
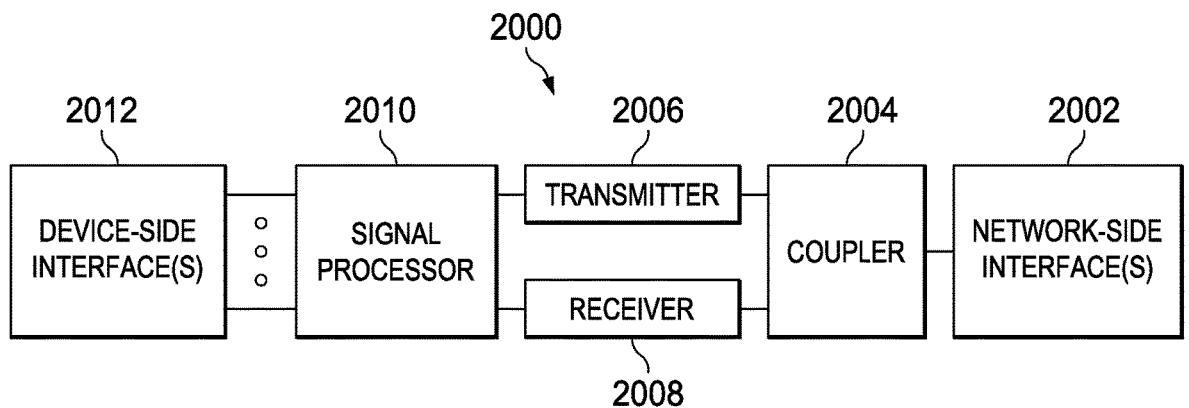
FIG. 20 is a diagram of an embodiment transceiver.

In some embodiments, one or more of the interfaces 1910, 1912, 1914 connects the processing system 1900 to a transceiver adapted to transmit and receive signaling over the telecommunications network. FIG. 20 is a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 1900, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for transmitting signals, the method comprising:

transmitting, by a transmit point, a first orthogonal frequency division multiplexing (OFDM)-based signal using a first sub-carrier spacing over a first carrier of a plurality of aggregated carriers for carrier aggregation;

transmitting, by the transmit point, a second OFDM-based signal using a second sub-carrier spacing over the first carrier of the plurality of aggregated carriers for the carrier aggregation; and transmitting, by the transmit point, a third OFDM-based signal using a third sub-carrier spacing over a second carrier of the plurality of aggregated carriers for the carrier aggregation, wherein the first carrier has a first carrier bandwidth associated with a first set of numerologies, the second carrier has a second carrier bandwidth associated with a second set of numerologies, the first set of numerologies comprises a first numerology associated with the first sub-carrier spacing and a second numerology associated with the second sub-carrier spacing different from the first sub-carrier spacing, the second set of numerologies comprises a third numerology associated with the third sub-carrier spacing, and the first carrier bandwidth is wider than the second carrier bandwidth, and both of the first sub-carrier spacing and the second sub-carrier spacing are larger than the third sub-carrier spacing.

2. The method of claim 1, wherein the second carrier has a 5 MHz carrier bandwidth, and the third sub-carrier spacing is 15 kHz.

3. The method of claim 1, wherein the first carrier has a carrier bandwidth larger than 5 MHz, and the first sub-carrier spacing, and the second sub-carrier spacing are 30 kHz and 60 kHz, respectively.

4. The method of claim 1, wherein the first carrier has a 10 MHz, 15 MHz, or 20 MHz carrier bandwidth, and wherein the first set of numerologies further comprises a fourth sub-carrier spacing of 15 kHz or a fifth sub-carrier spacing of 120 kHz.

5. The method of claim 1, wherein the first carrier and the second carrier are separated by a guard band that is less than or equal to twenty multiples of any of the first sub-carrier spacing, the second sub-carrier spacing, or the third sub-carrier spacing.

6. The method of claim 1, wherein the first carrier and the second carrier are separated by a guard band that is less than or equal to ten multiples of any of the first sub-carrier spacing, the second sub-carrier spacing, or the third sub-carrier spacing.

7. The method of claim 1, wherein the first set of numerologies comprises a first transmission time interval (TTI) and a second TTI, and the second set of numerologies comprises a third TTI, and wherein both the first TTI and the second TTI are shorter than the third TTI.

8. A transmit point comprising:
a processor; and
a computer readable storage medium storing programming for execution by the processor, the programming comprising instructions to:
transmit a first orthogonal frequency division multiplexing (OFDM)-based signal using a first sub-carrier spacing over a first carrier of a plurality of aggregated carriers for carrier aggregation;
transmit a second OFDM-based signal using a second sub-carrier spacing over the first carrier of the plurality of aggregated carriers for the carrier aggregation; and transmit a third OFDM-based signal using a third sub-carrier spacing over a second carrier of the plurality of aggregated carriers for the carrier aggregation, wherein the first carrier has a first carrier bandwidth associated with a first set of numerologies, the second carrier has a second carrier bandwidth associated with a second set of numerologies, the first set of numerologies comprises a first numerology associated with the first sub-carrier spacing and a second numerology associated with the second sub-carrier spacing different from the first sub-carrier spacing, the second set of numerologies comprises a third numerology associated with the third sub-carrier spacing, and the first carrier bandwidth is wider than the second carrier bandwidth, and both of the first sub-carrier spacing and the second sub-carrier spacing are larger than the third sub-carrier spacing.

9. The transmit point of claim 8, wherein the second carrier has a 5 MHz carrier bandwidth, and the third sub-carrier spacing is 15 kHz.

10. The transmit point of claim 8, wherein the first carrier has a carrier bandwidth larger than 5 MHz, and the first sub-carrier spacing, and the second sub-carrier spacing are 30 kHz and 60 kHz, respectively.

11. The transmit point of claim 8, wherein the first carrier has a 10 MHz, 15 MHz, or 20 MHz carrier bandwidth, and wherein the first set of numerologies further comprises a fourth sub-carrier spacing of 15 kHz or a fifth sub-carrier spacing of 120 kHz.

12. The transmit point of claim 8, wherein the first carrier and the second carrier are separated by a guard band that is less than or equal to twenty multiples of any of the first sub-carrier spacing, the second sub-carrier spacing, or the third sub-carrier spacing.

13. The transmit point of claim 8, wherein the first carrier and the second carrier are separated by a guard band that is less than or equal to ten multiples of any of the first sub-carrier spacing, the second sub-carrier spacing, or the third sub-carrier spacing.

14. The transmit point of claim 8, wherein the first set of numerologies comprises a first transmission time interval (TTI) and a second TTI, and the second set of numerologies comprises a third TTI, and wherein both the first TTI and the second TTI are shorter than the third TTI.

15. A method for receiving signals, the method comprising:
receiving, by a receive point from a transmit point, a first orthogonal frequency division multiplexing (OFDM)-based signal using a first sub-carrier spacing over a first carrier of a plurality of aggregated carriers for carrier aggregation;

receiving, by the receive point from the transmit point, a second OFDM-based signal using a second sub-carrier spacing over the first carrier of the plurality of aggregated carriers for the carrier aggregation; and receiving, by the receive point from the transmit point, a third OFDM-based signal using a third sub-carrier spacing over a second carrier of the plurality of aggregated carriers for the carrier aggregation, wherein the first carrier has a first carrier bandwidth associated with a first set of numerologies, the second carrier has a second carrier bandwidth associated with a second set of numerologies the first set of numerologies comprises a first numerology associated with the first sub-carrier spacing and a second numerology associated with the second sub-carrier spacing different from the first sub-carrier spacing, and the second set of numerologies comprises a third numerology associated with the third sub-carrier spacing, and wherein the first carrier bandwidth is wider than the second carrier bandwidth, and both of the first sub-carrier spacing and the second sub-carrier spacing are larger than the third sub-carrier spacing.

16. The method of claim 15, wherein the second carrier has a 5 MHz carrier bandwidth, and the third sub-carrier spacing is 15 kHz.

17. The method of claim 15, wherein the first carrier has a carrier bandwidth larger than 5 MHz, and the first sub-carrier spacing and the second sub-carrier spacing are 30 kHz and 60 kHz, respectively.

18. The method of claim 15, wherein the first carrier has a 10 MHz, 15 MHz, or 20 MHz carrier bandwidth, and wherein the first set of numerologies further comprises a fourth sub-carrier spacing of 15 kHz or a fifth sub-carrier spacing of 120 kHz.

19. The method of claim 15, wherein the first carrier and the second carrier are separated by a guard band that is less than or equal to twenty multiples of any one of the first sub-carrier spacing, the second sub-carrier spacing, or the third sub-carrier spacing.

20. The method of claim 15, wherein the first carrier and the second carrier are separated by a guard band that is less than or equal to ten multiples of any of the first sub-carrier spacing, the second sub-carrier spacing, or the third sub-carrier spacing.

21. The method of claim 15, wherein the first set of numerologies comprises a first transmission time interval (TTI) and a second TTI, and the second set of numerologies comprises a third TTI, and wherein both the first TTI and the second TTI are shorter than the third TTI.

22. A receive point comprising:
a processor; and
a computer readable storage medium storing programming for execution by the processor, the programming comprising instructions to:
receive, from a transmit point, a first orthogonal frequency division multiplexing (OFDM)-based signal using a first sub-carrier spacing over a first carrier of a plurality of aggregated carriers for carrier aggregation;
receive, from the transmit point, a second OFDM-based signal using a second sub-carrier spacing over the first carrier of the plurality of aggregated carriers for the carrier aggregation; and
receive, from the transmit point, a third OFDM-based signal using a third sub-carrier spacing over a second carrier of the plurality of aggregated carriers for the carrier aggregation, wherein
the first carrier has a first carrier bandwidth associated with a first set of numerologies,
the second carrier has a second carrier bandwidth associated with a second set of numerologies
the first set of numerologies comprises a first numerology associated with the first sub-carrier spacing and a second numerology associated with the second sub-carrier spacing different from the first sub-carrier spacing, and the second set of numerologies comprises a third numerology associated with the third sub-carrier spacing, and wherein the first carrier bandwidth is wider than the second carrier bandwidth, and both of the first sub-carrier spacing and the second sub-carrier spacing are larger than the third sub-carrier spacing.

23. The receive point of claim 22, wherein the second carrier has a 5 MHz carrier bandwidth, and the third sub-carrier spacing is 15 kHz.

24. The receive point of claim 22, wherein the first carrier has a carrier bandwidth larger than 5 MHz, and the first sub-carrier spacing and the second sub-carrier spacing are 30 kHz and 60 kHz, respectively.

25. The receive point of claim 22, wherein the first carrier has a 10 MHz, 15 MHz, or 20 MHz carrier bandwidth, and wherein the first set of numerologies further comprises a fourth sub-carrier spacing of 15 kHz or a fifth sub-carrier spacing of 120 kHz.

26. The receive point of claim 22, wherein the first carrier and the second carrier are separated by a guard band that is less than or equal to twenty multiples of any one of the first sub-carrier spacing, the second sub-carrier spacing, or the third sub-carrier spacing.

27. The receive point of claim 22, wherein the first carrier and the second carrier are separated by a guard band that is less than or equal to ten multiples of any of the first sub-carrier spacing, the second sub-carrier spacing, or the third sub-carrier spacing.

28. The receive point of claim 22, wherein the first set of numerologies comprises a first transmission time interval (TTI) and a second TTI, and the second set of numerologies comprises a third TTI, and wherein both the first TTI and the second TTI are shorter than the third TTI.

29. The method of claim 1, wherein the first carrier and the second carrier are separated by a guard band that is less than or equal to five multiples of any of the first sub-carrier spacing, the second sub-carrier spacing, or the third sub-carrier spacing.

30. The method of claim 1, wherein the first carrier and the second carrier are separated by a guard band that is less than or equal to three multiples of any of the first sub-carrier spacing of one, the second sub-carrier spacing, or the third sub-carrier spacing.

31. The method of claim 1, wherein the first carrier and the second carrier are separated by a guard band that is equal to any of the first sub-carrier spacing, the second sub-carrier spacing, or the third sub-carrier spacing.

32. The transmit point of claim 8, wherein the first carrier and the second carrier are separated by a guard band that is less than or equal to five multiples of any of the first sub-carrier spacing, the second sub-carrier spacing, or the third sub-carrier spacing.

33. The transmit point of claim 8, wherein the first carrier and the second carrier are separated by a guard band that is less than or equal to three multiples of any of the first sub-carrier spacing of one, the second sub-carrier spacing, or the third sub-carrier spacing.

34. The transmit point of claim 8, wherein the first carrier and the second carrier are separated by a guard band that is equal to any of the first sub-carrier spacing, the second sub-carrier spacing, or the third sub-carrier spacing.

35. The method of claim 15, wherein the first carrier and the second carrier are separated by a guard band that is less than or equal to five multiples of any of the first sub-carrier spacing, the second sub-carrier spacing, or the third sub-carrier spacing.

36. The method of claim 15, wherein the first carrier and the second carrier are separated by a guard band that is less than or equal to three multiples of any of the first sub-carrier spacing of one, the second sub-carrier spacing, or the third sub-carrier spacing.

37. The receive point of claim 22, wherein the first carrier and the second carrier are separated by a guard band that is equal to any of the first sub-carrier spacing, the second sub-carrier spacing, or the third sub-carrier spacing.

38. The receive point of claim 22, wherein the first carrier and the second carrier are separated by a guard band that is less than or equal to five multiples of any of the first sub-carrier spacing, the second sub-carrier spacing, or the third sub-carrier spacing.

39. The receive point of claim 22, wherein the first carrier and the second carrier are separated by a guard band that is less than or equal to three multiples of any of the first sub-carrier spacing of one, the second sub-carrier spacing, or the third sub-carrier spacing.

40. The receive point of claim 22, wherein the first carrier and the second carrier are separated by a guard band that is equal to any of the first sub-carrier spacing, the second sub-carrier spacing, or the third sub-carrier spacing.

\* \* \* \* \*